US012012681B2

(12) United States Patent
He et al.

(10) Patent No.: US 12,012,681 B2
(45) Date of Patent: *Jun. 18, 2024

(54) METHOD FOR PREPARING FULLY-DEGRADABLE NON-WOVEN FABRIC BY SPUN-BONDING

(71) Applicants: CHINA YUNHONG HOLDINGS CO., LTD., Hubei (CN); Yunhong Environmental Technology Co., Ltd., Hubei (CN); Guozhong Xinghe Biomedical Technology Co., Ltd., Hubei (CN)

(72) Inventors: Jingren He, Hubei (CN); Yubao Li, Hubei (CN); Dong Wu, Hubei (CN); Shuxin Ye, Hubei (CN); Sijia Jiang, Hubei (CN); Rui Zhang, Hubei (CN)

(73) Assignees: China Yunhong Holdings Co., Ltd., Huanggang (CN); Yunhong Environmental Technology Co., Ltd., Huanggang (CN); Guozhong Xinghe Biomedical Technology Co., Ltd., Huanggang (CN)

( * ) Notice: Subject to any disclaimer, the term of this patent is extended or adjusted under 35 U.S.C. 154(b) by 323 days.

This patent is subject to a terminal disclaimer.

(21) Appl. No.: 17/507,790

(22) Filed: Oct. 21, 2021

(65) Prior Publication Data

US 2022/0042223 A1 Feb. 10, 2022

(30) Foreign Application Priority Data

Jun. 28, 2021 (CN) .......................... 202110719866.8

(51) Int. Cl.
| | |
|---|---|
| *D04H 1/56* | (2006.01) |
| *B29B 9/12* | (2006.01) |
| *C08G 63/08* | (2006.01) |
| *C08G 63/78* | (2006.01) |
| *C08G 63/90* | (2006.01) |
| *C08G 63/91* | (2006.01) |
| *D01D 5/088* | (2006.01) |

(52) U.S. Cl.
CPC ................. *D04H 1/56* (2013.01); *B29B 9/12* (2013.01); *C08G 63/08* (2013.01); *C08G 63/785* (2013.01); *C08G 63/90* (2013.01); *C08G 63/912* (2013.01); *D01D 5/088* (2013.01); *D10B 2331/041* (2013.01); *D10B 2401/12* (2013.01)

(58) Field of Classification Search
None
See application file for complete search history.

(56) References Cited

FOREIGN PATENT DOCUMENTS

| | | | |
|---|---|---|---|
| CN | 110699955 A | | 1/2020 |
| CN | 111593484 A | | 8/2020 |
| CN | 111688306 A | | 9/2020 |
| CN | 112592571 A | * | 4/2021 |
| CN | 112831032 A | * | 5/2021 |
| CN | 113308803 A | | 8/2021 |

OTHER PUBLICATIONS

Feichao et al.: "spinnability of poly (lactic acid) / poly (3-hydroxybutyrate-co-3-hydroxyvalerate) for spun-bonded nonwovens", Journal of Textile Research, vol. 35 No. 9, Sep. 2014, p. 19-24 (Year: 2014).*

* cited by examiner

*Primary Examiner* — Mohammad M Ameen

(57) ABSTRACT

Disclosed is a method for preparing a fully-degradable non-woven fabric by spun-bonding, including: (S1) preparation of a poly(caprolactone-co-lactide acid) (P(CL-co-LA)); (S2) preparation of a copolymerized-modified poly (lactide acid) (PLA); and (S3) preparation of a full-degradable non-woven fabric using a spun-bond method. In this disclosure, the PLA is modified in gradient several times to prepare the full-degradable non-woven fabric in combination with an optimized spun-bonding method.

10 Claims, No Drawings

METHOD FOR PREPARING FULLY-DEGRADABLE NON-WOVEN FABRIC BY SPUN-BONDING

CROSS-REFERENCE TO RELATED APPLICATIONS

This application claims the benefit of priority from Chinese Patent Application No. 202110719866.8, filed on Jun. 28, 2021. The content of the aforementioned application, including any intervening amendments thereto, is incorporated herein by reference.

TECHNICAL FIELD

The present application relates to non-woven fabrics, and more particularly to a method for preparing a fully-degradable non-woven fabric by spun-bonding.

BACKGROUND

The non-woven fabric is composed of directional or random fibers and belongs to the new-generation environment-friendly material. The non-woven fabric is breathable and thin, good in flexibility, non-combustible, non-toxic and non-irritating, and has low cost.

The spun-bonding method is a process for manufacturing a non-woven fabric from a polymer through spinning, drawing, laying, needle punching, spun lacing, and hot rolling or self-bonding, which is easier than the melt-blown method.

At present, spun-bonded non-woven fabrics mainly use polypropylene, polyethylene, or polypropylene as raw materials. For instance, Chinese Patent Application No. 202010511133.0 discloses a flame-retardant and waterproof non-woven fabric of polypropylene SMS composite, in which the non-woven fabric cannot be degraded after being discarded, so it will cause environmental pollution. Therefore, it is urgent to provide a fully-degradable non-woven fabric and a method for making the same by spun-bonding.

SUMMARY

An object of this application is to provide a method for preparing a full-degradable non-woven fabric produced by a spun-bond method, in which polylactic acid (PLA) is modified multiple times in a gradient, combing with an optimized spun-bond method to achieve the production of a full-degradable non-woven fabric, and the non-woven fabric has excellent performance.

To achieve the above-mentioned object, this disclosure provides a method for preparing a full-degradable non-woven fabric produced by a spun-bond method, comprising:

(S1) preparation of a poly(caprolactone-co-lactide acid) (P(CL-co-LA))

adding lactide acid (L-LA) and ε-caprolactone (ε-CL) into a reactor to obtain a reaction system, wherein a weight ratio of the L-LA to the ε-CL is 1:(2-4); in an embodiment, the weight ratio of the L-LA to the ε-CL is 1:3;

adding a catalyst accounting for 0.1-0.2% by weight of the reaction system into the reaction system, followed by reaction at 130-140° C. under a vacuum condition for 18-24 h to obtain a crude copolymer; in an embodiment, the catalyst comprises a N,N-donor zinc guanidine catalyst; and purifying the crude copolymer followed by drying at 40-50° C. in a vacuum oven to obtain the P(CL-co-LA);

(S2) preparation of a copolymerized-modified poly(lactide acid) (PLA) subjecting PLA to drying, wherein a melt index of the PLA at 210° C. is 20-40 g/10 min;

mixing the dried PLA and the (P(CL-co-LA)) uniformly, followed by melting and blending at 150-160° C. under a rotation speed of 100-120 r/min to obtain a blend, wherein a mass ratio of the dried PLA and the (P(CL-co-LA)) is (10-50):1, and a blending time is 5-10 min; in an embodiment, the blending time is 8 min; and molding and forming the blend at 180-190° C. under 8-10 MPa to obtain the copolymerized-modified PLA;

(S3) preparation of a full-degradable non-woven fabric using a spun-bond method blending the copolymerized-modified PLA, poly(3-hydroxy-butyrate-co-3-hydroxy-valerate) (PHBV), nano-SiO$_2$, a compatibilizer and a chain extender to obtain a melt-blown blend, wherein a mass ratio of the copolymerized-modified PLA, the PHBV, the nano-SiO$_2$, the compatibilizer and the chain extender is (70-85):(1-3):(0.2-0.3):(0.005-0.01):(0.001-0.005); before the blending, slicing the copolymerized-modified PLA followed by drying at 60° C. for 24-48 h to reduce a water content of the copolymerized-modified PLA to be less than 0.025%;

adding the melt-blown blend into a screw extruder, followed by melting and extruding at 160-200° C. to obtain a blended pellet; and adding the blended pellet into the screw extruder to be extruded and melted to form a hot melt; accurately metering the blended pellet by a metering pump to be delivered to a spinning assembly; subjecting the blended pellet to spinning to be ejected from a spinning hole of the spinning assembly to obtain spun fibers; subjecting the spun fibers to cooling and blowing, air-drawing, laying, and hot-rolling and bonding to obtain a non-woven material; and finally crimping the non-woven material via a winder to obtain the full-degradable non-woven fabric.

In an embodiment, the step of "purifying the crude copolymer product to obtain the P(CL-co-LA)" in step (S1) comprises:

(S11) processing the crude copolymer with ultrasonic treatment and/or microwave treatment, and precipitation using an ethanol solution with a volume fraction of 90%; and (S12) repeating step (S11) 1-2 times to obtain the P(CL-co-LA).

In an embodiment, in the ultrasonic treatment, an ultrasonic power is 250-350 W, and a treating time is 1.5-2.5 h; and in the microwave treatment, a microwave power is 250-350 W, and a treating time is 1.5-2.5 h.

In an embodiment, the compatibilizer in step (S3) is selected from the group consisting of maleic anhydride, butyric anhydride, stearic anhydride, tannic acid, and a combination thereof.

In an embodiment, the compatibilizer is consist of maleic anhydride, butyric anhydride, stearic anhydride and tannic acid; and a mass ratio of maleic anhydride, butyric anhydride, stearic anhydride and tannic acid is 1:2:2:1.

In an embodiment, the chain extender in step (S3) is ADR chain extender (that is, a multi-epoxy chain extender).

In an embodiment, in step (S3), a spinning temperature is 160-180° C.; during the cooling and blowing, a temperature of an airflow is 20-24° C., and a flow rate of the airflow is 0.8-1 m/s; a speed of the air-drawing is controlled to 4500-5000 m/min; during the hot-rolling and bonding, a temperature of a hot pressing roll is 135-145° C. (preferably, 140° C.), a pressure of the hot pressing roll is 6-10 MPa (preferably, 8-9 MPa), and a speed of a rolling mill is 31-33 rpm (preferably, 32 rpm); and a frequency of the metering pump is 24-28 Hz, and a frequency of a web curtain is 6-8 Hz.

This application has the following beneficial effects.

The non-woven fabric in this application is made of PLA and other full-degradable raw materials, which will not cause environmental pollution after being discarded. The non-woven fabric is suitable for preparation by an optimized spun-bond process. Moreover, PLA is subjected to blending modification and chain-extension modification, which can change the structure of PLA, thereby changing the properties of the polymer and ensuring that the final obtained non-woven fabric has excellent properties.

DETAILED DESCRIPTION OF EMBODIMENTS

To render the object, technical solutions, and advantages of the present invention clearer, the embodiments of this disclosure will be further described below.

EXAMPLE 1

Provided herein was a method for preparing a full-degradable non-woven fabric produced by a spun-bond method, which was specifically described as follows.

(S1) Preparation of a poly(caprolactone-co-lactide acid) (P(CL-co-LA))

Lactide acid (L-LA) and ε-caprolactone (ε-CL) were added into a reactor to obtain a reaction system, where a weight ratio of the L-LA to the ε-CL was 1:(2-4), preferably, 1:3.

A catalyst accounting for 0.1-0.2% by weight of the reaction system was added into the reaction system, followed by reaction at 130-140° C. under a vacuum condition for 18-24 h to obtain a crude copolymer. Preferably, the catalyst included an N, N-donor zinc guanidine catalyst, which was non-toxic and simple for synthesis, had a better ultra-polymer activity and faster catalytic reaction rate compared with a common catalyst (Stannous octoate) used in the production of PLA. The polymer produced by using the N,N-donor zinc guanidine catalyst had better material stability and high molecular weight.

The crude copolymer was subjected to purifying followed by drying at 40-50° C. (Preferably, 45° C.) in a vacuum oven to obtain the P(CL-co-LA). The purifying of the crude copolymer included the following steps.

(S11) The crude copolymer was processed with ultrasonic treatment and/or microwave treatment, and precipitation using an ethanol solution with a volume fraction of 90%.

(S12) Step (S11) was repeated 1-2 times to obtain the P(CL-co-LA).

In an embodiment, in the ultrasonic treatment, an ultrasonic power was 250-350 W, and a treating time was 1.5-2.5 h. In the microwave treatment, a microwave power was 250-350 W, and a treating time was 1.5-2.5 h. Therefore, the melt flow capacity of PLA was improved by copolymerization modification through step (S1).

(S2) Preparation of a copolymerized-modified poly(lactide acid) (PLA)

The PLA was dried. The dried PLA and the (P(CL-co-LA)) was mixed uniformly, followed by melting and blending at 150-160° C. under a rotation speed of 100-120 r/min to obtain a blend, where a mass ratio of the dried PLA and the (P(CL-co-LA)) was (10-50): 1, and a blending time was 5-10 min.

The blend was molded and formed at 180-190° C. under 8-10 MPa to obtain the copolymerized-modified PLA.

(S3) Preparation of a full-degradable non-woven fabric using a spun-bond method the copolymerized-modified PLA, poly(3-hydroxy-butyrate-co-3-hydroxy-valerate) (PHBV), nano-$SiO_2$, a compatibilizer and a chain extender were blended to obtain a melt-blown blend, where a mass ratio of the copolymerized-modified PLA, the PHBV, the nano-$SiO_2$, the compatibilizer and the chain extender is (70-85):(1-3):(0.2-0.3):(0.005-0.01):(0.001-0.005).

Before the blending, the copolymerized-modified PLA was sliced followed by drying at 60° C. for 24-48 h to reduce a water content of the copolymerized-modified PLA to be less than 0.025%. The compatibilizer is selected from the group consisting of maleic anhydride, butyric anhydride, stearic anhydride, tannic acid, and a combination thereof. Preferably, the compatibilizer is consist of maleic anhydride, butyric anhydride, stearic anhydride and tannic acid, and a mass ratio of maleic anhydride, butyric anhydride, stearic anhydride and tannic acid is 1:2:2:1. The chain extender is an ADR chain extender (that is, a multi-epoxy chain extender).

The melt-blown blend was added into a screw extruder followed by melting and extruding at 160-200° C. to obtain a blended pellet.

The blended pellet was added into the screw extruder to be extruded and melted to form a hot melt, then the blended pellet was accurately metered by a metering pump to be delivered to a spinning assembly followed by being ejected from a spinning hole of the spinning assembly to obtain spun fibers. The spun fibers were subjected to cooling and blowing, air-drawing, laying, and hot-rolling and bonding to obtain a non-woven material. Finally, the non-woven material was crimped via a winder to obtain the full-degradable non-woven fabric. A spinning temperature was 160-180° C. During the cooling and blowing, a temperature of airflow was 20-24° C.; a flow rate of the airflow was 0.8-1 m/s; and a speed of the air-drawing is controlled to 4500-5000 m/min During the hot-rolling and bonding, a temperature of a hot-pressing roller was 135-145° C. (preferably, 140° C.), a pressure of the hot-pressing roller was 6-10 MPa (preferably, 8-9 MPa), and a speed of a rolling mill was 31-33 rpm (preferably, 32 rpm). A frequency of the metering pump was 24-28 Hz, and a frequency of a web curtain was 6-8 Hz.

In step (S1) of this embodiment, the crude copolymer was processed with ultrasonic treatment and/or microwave treatment to assist purifying to increase the yield of the copolymerized-modified product, namely, the yield of the (P(CL-co-LA)). The auxiliary purification steps of the crude copolymer were optimized below by setting different modes and conditions of purification for the crude copolymer, as shown in Table 1.

TABLE 1

Effects of assisted purification on the yield of the P(CL-co-LA)

| Conditions of auxiliary purification | Average yield of the P(CL-co-LA) (%) |
|---|---|
| — | 81% |
| Ultrasonic treatment (an ultrasonic power was 250-350 W, and a treating time was 1.5-2.5 h.) | 93% |
| Microwave treatment (a microwave power was 250-350 W, and a treating time was 1.5-2.5 h.) | 87% |
| Ultrasonic treatment combining with microwave treatment | 96% |

Note:
"—" represented that the crude copolymer was not processed with auxiliary purification and was taken as the (P(CL-co-LA)).

As shown in Table 1, when no auxiliary purification treatment was used, the average yield of the P (CL-co-LA) was only about 81%. While an ultrasonic treatment combining with a microwave treatment could significantly improve the average yield, and at the time the average yield was the highest. Therefore, in step (S11), the crude copolymer was preferably subjected to ultrasonic treatment and microwave treatment, and the ultrasonic treatment conditions were: the ultrasonic power was 280 W, and the treating time was 1.5 h. The microwave treatment conditions were: the microwave power was 280 W, and the treating time was 1.5 h.

In this example, the mass ratio of the PLA to the P (CL-co-LA) (denoted as PLA/P (CL-co-LA)) was also optimized to discusses the effects on the tensile strength and the temperature of glass transition of the copolymerized modified PLA to improve the performance of the copolymerized modified PLA, as shown in Table 2. The tensile strength of the copolymerized modified PLA was tested according to GB/T1040-2006, and the tensile rate was 10 mm/min. The temperature of the glass transition of copolymerized modified PLA was tested by the DMA test method, that is, the film stretching mode was adopted, the frequency was 1 Hz, the heating rate was 3° C./min, and the amplitude was 15 μm.

TABLE 2

Effect of PLA/P (CL-co-LA) on the copolymerized modified PLA

| PLA/P(CL-co-LA) | Tensile strength (MPa) | Temperature of glass transition (° C.) |
|---|---|---|
| 100/0 | 59 | 81 |
| 98/2 | 69 | 72 |
| 96/4 | 62 | 73 |
| 92/8 | 56 | 79 |

As shown in Table 2, with the content of P(CL-co-LA) increased, the tensile strength of the blend increased first and then decreased. When the mass fraction of the P(CL-co-LA) was relatively small (for example, only 2%), the P(CL-co-LA) was evenly dispersed between the molecular chains of the PLA, occupying the gaps between the molecular chains of the PLA such that the molecular chains were packed more tightly, thereby improving the tensile strength of the copolymerized modified PLA. When the P(CL-co-LA) continued to increase, the P(CL-co-LA) were aggregated, and at this time the plasticity of the P(CL-co-LA) played a leading role, so the tensile strength of the copolymerized modified PLA decreased with the increase of P(CL-co-LA). After testing the copolymerized modified PLA by the DMA test method, it was found that the temperature of glass transition of the copolymerized modified PLA decreased first and then increased. When the mass ratio of PLA/P(CL-co-LA) was 98/2 (namely, 49:1), the temperature of the glass transition was the lowest, indicating that the addition of a small amount of P(CL-co-LA) could play the role of internal lubrication and reduced the temperature of glass transition, which was consistent with the stretching results. In summary, in step (S2), the PLA and the P(CL-co-LA) were mixed uniformly according to a mass ratio of 49:1.

In step (S3), as the PLA molecule contained hydrophilic ester groups with a water content of 0.4%-0.6%, the molten PLA degraded very quickly under the presence of water, which further leaded to a decrease in the molecular weight and a wide distribution of the molecular weight of the PLA, resulting in the unsuitable molecular weight and distribution thereof for spinning requirements. On the other hand, the polymer fluid channel was closed during the melt spinning process. When the polymer was melted by heat, the presence of water would not only affect the viscosity of the polymer after melting and the extrusion state of the fluid, but also might form many tiny bubbles in the material, and these bubbles might cause wire breakage during the stretching process, and at the same time have extremely adverse effects on the mechanical properties of the product and the diameter of the fiber.

As the water content, drying time, and drying temperature of the slice were the main factors affecting the thermal degradation of PLA. The higher the slice water content, the greater the degree of degradation and the faster the degradation rate. With the extension of the drying time, the degree of degradation was intensified. The higher the drying temperature, the faster the degradation rate and the greater the degree of degradation. Therefore, in step (S3), before the blending, the copolymerized modified PLA should be dried to reduce the water content. When the drying temperature was 60° C., the effect of the drying time on the copolymerized modified PLA was shown in Table 3.

TABLE 3

Effect of the drying time on the copolymerized modified PLA at 60° C.

| Drying time (h) | Average water content of the copolymerized modified PLA slice |
|---|---|
| 12 | 0.136% |
| 24 | 0.074% |
| 36 | 0.058% |
| 48 | 0.017% |

Therefore, in step (S3), it was preferable to dry the copolymerized modified PLA slice at 60° C. for 48 h to reduce the water content to 0.025% while avoiding thermal degradation. The content of impurities and water in the PLA slice was controlled to ensure the smooth progress of spinning.

At the same time, in step (S3), the copolymerized modified PLA, PHBV, nano $SiO_2$, compatibilizer, and chain extender were blended to perform the blending modification and chain extension modification. In the process of further obtaining the spun-bond blend, the proportions of the above components were also optimized herein to investigate how it affected the properties of the final full-degradable non-woven fabric. Table 4 showed the effect of the mass ratio of copolymerized modified PLA to the PHBV on the performance of the full-degradable non-woven fabric.

TABLE 4

Mass ratios of the copolymerized modified PLA, PHBV, compatibilizer, chain extender, and $SiO_2$

| Samples | Copolymerized modified PLA | PHBV | Compatibilizer | Chain extender | $SiO_2$ |
|---|---|---|---|---|---|
| 1 | 100 | — | — | — | — |
| 2 | 85 | 3 | 0.008 | 0.003 | 0.3 |
| 3 | 80 | 2 | 0.008 | 0.003 | 0.3 |
| 4 | 75 | 2 | 0.008 | 0.003 | 0.3 |
| 5 | 70 | 1 | 0.008 | 0.003 | 0.3 |

Based on this, the YG028-500 strength tester was used to test the mechanical properties of the full-degradable non-woven fabric. The results were shown in Table 5.

TABLE 5

Effects of the mass ratio of the copolymerized modified PLA and the PHBV on the mechanical properties of the full-degradable non-woven fabric

| Samples | Longitudinal strength (N) | Transverse strength (N) | Longitudinal elongation (%) | Traverse elongation (%) |
|---|---|---|---|---|
| 1 | 13.09 | 8.15 | 18.98 | 19.53 |
| 2 | 12.23 | 7.85 | 49.39 | 50.98 |
| 3 | 12.46 | 7.93 | 43.78 | 49.37 |
| 4 | 11.46 | 7.53 | 51.43 | 52.03 |
| 5 | 12.84 | 8.04 | 23.25 | 29.85 |

In the processing procedures such as mixing, extrusion, injection molding, and spinning, the macromolecular chain of PLA would be broken due to the effect of heat, moisture and impurities, resulting in a decrease in the performance of the material. Active groups (terminal carboxyl and terminal hydroxyl) would be produced at the break of the PLA molecular chain. The chain extender relied on its active epoxy groups to participate in coupling and branching reactions with the groups at the active end generated at the breaks of the molecular chain, thereby increasing the length of the molecular chain, obtaining more long-chain branches, and increasing the processing stability of PLA.

As shown in Table 5, with the addition of PHBV, the transverse strength and longitudinal strength of the full-degradable non-woven fabric decreased slightly, but the longitudinal elongation and transverse elongation increased greatly, indicating that the blending of the PHBV and copolymerized modified PLA could give play to their performance advantages respectively. At the same time, a small amount of nano-$SiO_2$ was added in good dispersibility, playing a good role in strengthening and toughening. From the view of micromechanics, the nano-$SiO_2$ could uniformly disperse rigid nanoparticles in the polymer. When the polymer was subjected to external force, the presence of rigid inorganic particles produced a stress concentration effect, which stimulated the surrounding polymer to produce microcracks (or silver streaks), and absorbed a certain deformation work. And at the same time, the polymer between the particles produced yields and plastic deformation, and absorbed impact energy. In addition, the presence of rigid particles hindered and passivated the crack propagation of the polymer, and eventually stopped it to avoid being developed into destructive cracking, resulting in an enhanced toughening effect. In summary, in the spun-bonded blend of step (S3), the mass ratio of the copolymerized modified PLA and PHBV was preferably 75:2.

Further, when the mass ratio of the copolymerization modified PLA:PHBV:nano-$SiO_2$:chain extender was 75:2: 0.3:0.003, the effects of different compatibilizer compositions on the mechanical properties of the full-degradable non-woven fabric was investigated. The testing process of the mechanical properties of the full-degradable non-woven fabric was the same as above, and the results were shown in Table 6.

TABLE 6

Effects of compatibilizer composition on the mechanical properties of the full-degradable non-woven fabric

| Type of compatibilizers | Longitudinal strength (N) | Transverse strength (N) | Longitudinal elongation (%) | Traverse elongation (%) |
|---|---|---|---|---|
| Maleic anhydride | 11.46 | 7.53 | 51.43 | 52.03 |
| Maleic anhydride: butyric anhydride = 1:2 | 11.89 | 7.73 | 63.43 | 62.93 |
| Maleic anhydride: butyric anhydride: stearic anhydride = 1:2:2 | 12.48 | 8.23 | 66.75 | 65.74 |
| Maleic anhydride: butyric anhydride: stearic anhydride: tannic acid = 1:2:2:1 | 12.95 | 9.61 | 70.82 | 68.34 |

Most of the compatibilizers contained polar groups, which could undergo an esterification reaction or form hydrogen bonds with the polar groups in the filler, thereby reducing the polarity and hygroscopicity of the filler. And the compatibilizer also contained non-polar segments with good compatibility with the polymer, acting like a "bridge" to effectively bond the filler and the polymer together and improve the interfacial bonding performance. It could be seen from Table 6 that the optimal mass ratio of compatibilizer composition was maleic anhydride:butyric anhydride:stearic anhydride:tannic acid=1:2:2:1, under which the longitudinal strength, transverse strength, longitudinal elongation, and transverse elongation of the full-degradable non-woven fabric were all maximum.

It could be analyzed from Table 4-6 that the tensile strength and modulus of the PHBV were low. The PLA had the characteristics of high strength and high modulus, but due to its inherent brittleness, it had low breaking elongation, low impact strength, and was extremely easy to bending deflection. Therefore, after blending the PHBV and the copolymerized modified PLA, the toughness of the non-woven fabric could be improved while maintaining the degradation performance of the material. At the same time, to further increase the two-phase structure of the blend of the copolymerized modified PLA and PHBV, a compatibilizer (maleic anhydride, butyric anhydride, stearic anhydride, tannic acid or a mixture thereof) was added to the PLA/PHBV blend system, so that the copolymerized modified PLA and PHBV could be blended better and give play to their performance advantages. In addition, the PLA was a crystalline polymer with few long branches in the molecular chain and a low degree of branching. The PLA melt was sensitive to temperature, and was prone to produce thermal-oxidative degradation or hydrolysis during processing, causing the break of molecular chains. All of these factors lead to low melt viscosity and melt strength, poor melt viscoelasticity, and insufficient strain hardening, which limited the processing technology of the PLA. Therefore, on one hand, the relative molecular weight of PLA could be improved by adding chain extenders. On the other hand, the long-chain branched structure was introduced into the PLA molecule to increase the melt strength of the PLA, improving the processing properties of the PLA, such as film blowing, blow molding, and foaming.

In addition, the mass ratio of the copolymerized modified PLA:PHBV:nano $SiO_2$:compatibilizer:chain extender was set as 75:2:0.3:0.008:0.003. The effects of the parameters of the spun-bond-related process including the spinning temperature, the temperature and flow rate of the airflow (quench air) during blowing, the speed of air-drawing, the temperature of the hot-pressing roll, the pressure of the hot-pressing roll, the speed of the mill, the frequency of the metering pump, the frequency of the screen and other factors were investigated herein. The frequency of the metering pump referred to the speed of the engine of the metering pump, and the frequency of the screen referred to the speed of the engine that controlled the screen to move.

A 5 cm×20 cm sample was made according to FZ/T 60005-1991 "Textile Mechanical Properties Test Standard" to test the tensile breaking strength of the fabric by using the electronic fabric tensile strength tester. The clamping length of the sample was 10 cm, and the test results of the full-degradable non-woven fabric were shown in Table 7.

(1) Spinning Temperature

TABLE 7

Effects of the spinning temperature on the spinning effect

| Spinning temperature (° C.) | Spinning results |
|---|---|
| 170 | The fibers were stiff, the melt had poor fluidity, and the spinning was difficult. |
| 175 | The fibers could be extruded from the spinneret continuously and had poor flexibility. |
| 180 | The fibers could be extruded from the spinneret continuously, were smooth, and had certain flexibility. |
| 185 | The melt flows fast, the fibers were sticky and easy to break. |

As shown in Table 7, when the spinning temperature was 180° C., the spinning process could be performed smoothly and the prepared fiber has better performance, so the spinning temperature was preferably 180° C.

(2) Temperature and Flow Rate of the Quench Airflow

The cooling rate of the primary filament of the PLA extruded from the spinneret should be controlled. If the cooling was insufficient, the stretched crystals could no longer be preserved sufficiently and stably such that the strength of the filament fiber would be reduced. But the strong molecular segments tended to be difficult to crystallize if the cooling was too strong, and the formed fibers had low strength, poor toughness, and were easy to break, so the cooling conditions should be appropriate. Therefore, the temperature of the quench air was preferably 20° C., and the flow rate was preferably 0.9 m/s.

(3) Speed of the Air-Drawing

After a moderate cooling, the primary filament of the high polymer was subjected to a high-speed air-drawing to improve the orientation of fiber molecules and the stability of crystals. The higher the drawing speed, the higher the degree of fiber molecular orientation, the higher the strength of the monofilament, the better the quality of products. Whereas, a too high drawing speed would cause fiber breakage. Therefore, the speed of the air-drawing was preferably 4500 m/min.

(4) Temperature of the Hot-Pressing Roller

The tensile strength of the nonwoven fabric increased with the increase of the temperature of the hot-pressing roller, which was approximately linear. However, when the temperature exceeded a certain level, the fiber was subjected to a high temperature, which was easy to produce de-orientation to destroy the structure of the fiber, resulting in a decrease in the strength of the fabric. Therefore, the temperature of the hot-pressing roller should be set between the melting point and softening point of the fiber. In the scope of the test process, the increase in temperature improved the melting effect of the fiber surface and enhanced the bonding between the fibers. A too high temperature would change the structure of the fiber to form a film with poor crystallinity and orientation, resulting in a decrease in the strength of the fabric. If the temperature of the hot-pressing roller was relatively low, the bonding of the fiber web would be insufficient, and the prepared nonwoven fabric was soft and bendable, and had a reduced strength. And at the same time, the surface of the fabric was flurried.

Therefore, to improve the mechanical properties of the full-degradable non-woven fabric, the temperature of the hot-pressing roller was optimized herein under the conditions of a pressure of the hot-pressing roller of 9 MPa and a speed of the rolling mill of 32 rpm. The optimization settings were shown in Table 8.

TABLE 8

Effects of the temperature of the hot-pressing roller on the strength of the full-degradable non-woven fabric

| Temperature of the hot-pressing roller (° C.) | Longitudinal strength (N) | Transverse strength (N) |
|---|---|---|
| 135 | 13.98 | 11.91 |
| 140 | 15.73 | 12.65 |
| 145 | 14.73 | 12.41 |

It could be seen in Table 8, when the temperature of the hot-pressing roller was 140° C., the strength index of the full-degradable non-woven fabric was the best. Therefore, the optimum temperature of the hot-pressing roller was 140° C.

(5) Pressure of the Hot-Pressing Roller

The longitudinal and transverse strength of the product increased with the increase of the pressure of the hot-pressing roller, but when it exceeded a certain value, the physical characteristics of the hot adhesive fiber would be destroyed due to the excessive heating and hot pressing, resulting in the decline of the strength. The temperature of the hot rolling was optimized herein under the conditions of a temperature of the hot-pressing roller of 140° C. and a speed of the rolling mill of 32 rpm. The optimization settings were shown in Table 9.

TABLE 9

Effects of the pressure of the hot-pressing roller on the strength of the full-degradable non-woven fabric

| Pressure of the hot-pressing roller (MPa) | Longitudinal strength (N) | Transverse strength (N) |
|---|---|---|
| 6 | 14.97 | 11.67 |
| 7 | 15.64 | 11.98 |
| 9 | 15.73 | 12.65 |

As shown in Table 9, the pressure of the hot-pressing roller was 8-9 MPa, the strength index of the full-degradable non-woven fabric was the best. Therefore, the optimum pressure of the hot-pressing roller was 8-9 MPa.

(6) Linear Speed of the Rolling Mill

The linear speed of the rolling mill was closely related to the contact time with the hot rolling. The speed of the rolling mill during the hot rolling was optimized herein under the conditions of a temperature of the hot-pressing roller of 140°

C. and a pressure of the hot-pressing roller of 9 MPa. The optimized settings were shown in Table 10.

TABLE 10

Effects of the linear speed of the rolling mill on the strength of the full-degradable non-woven fabric

| Linear speed of the rolling mill (rpm) | Longitudinal strength (N) | Transverse strength (N) |
|---|---|---|
| 31 | 14.98 | 11.96 |
| 32 | 15.73 | 12.65 |
| 33 | 15.34 | 12.01 |

As shown in Table 10, the linear speed of the rolling mill was 32 rpm, the strength index of the full-degradable non-woven fabric was the best. Therefore, the linear speed of the rolling mill was 32 rpm.

After the hot rolling process, the spun-bonded non-woven fabric had rolling points on the surface and an uneven structure, which mainly because the melting of the fiber bonded with the surrounding fibers, and the original properties of the fiber remain in the unbonded area. This structure gave the fabric a good softness, air permeability and elasticity.

The tests of thickness and surface density were performed. The thickness test referred to FZ/T 60004-1991 "Nonwoven thickness measurement", and used a YG141N digital thickness tester for the test. With respect to the surface density test, it referred to GB/T 4669-2008 "Textiles-Woven fabrics-Determination of mass per unit length and mass per unit area", and used an XY series electronic balance for the test.

The fiber diameter test was performed. The size and distribution of the fiber diameter directly affected the pore size and distribution of the non-woven fabric, thus affecting the filtration performance of materials (filtration efficiency and filtration resistance). It was difficult to measure the fiber diameter directly, so the Smile-view software was used herein to measure the diameter of the fiber photographed by a scanning electron microscopy of the non-woven fabric to obtain the size and distribution of fiber diameter. The fiber diameters at 50 different positions in each sample were measured, and then the average value was taken to reduce the test error.

The permeability test was performed. The permeability of non-woven materials depended on many factors, including pore structure and fluid properties. Generally speaking, the larger the pore size, the higher the porosity and the better the permeability. According to GB/T 13764-1992 "Geotextiles-Test method for air permeability", a YG461E-III automatic air permeability meter was used herein to measure the permeability of fabric. Each sample was tested 10 times, and the average value was taken to reduce the experimental error.

Based on the above content, the frequencies of the metering pump and the web curtain were also optimized herein, the optimization settings were shown in Table 11.

TABLE 11

Effects of the frequency of the metering pump and the web curtain on the thickness and surface density of the full-degradable non-woven fabric

| Frequency of the metering pump (Hz) | Frequency of the web curtain (Hz) | Thickness (mm) | Surface density (g/mm$^2$) |
|---|---|---|---|
| 24 | 6 | 0.42 | 81 |
| 24 | 7 | 0.39 | 72 |
| 24 | 8 | 0.36 | 68 |
| 26 | 6 | 0.45 | 83 |
| 26 | 7 | 0.41 | 75 |
| 26 | 8 | 0.39 | 71 |
| 28 | 6 | 0.48 | 89 |
| 28 | 7 | 0.43 | 79 |
| 28 | 8 | 0.40 | 76 |

It could be seen from Table 11 that when the frequency of the metering pump was constant, with the increase of the web curtain frequency, the fabric thickness and surface density decreased. When the frequency of the web curtain was constant, with the increase of the frequency of the metering pump, the thickness and surface density of the fabric tended to become larger. Because when the metering pump frequency was constant, with the increase of the frequency of the web curtain, the number of fiber layering decreased, so the thickness and surface density of the fabric decreased. When the frequency of the web curtain was constant, with the increase of the frequency of the metering pump, the amount of melt extrusion per unit time increased, the number of the fiber layering increased, so the thickness and surface density of the fabric became larger.

The size of the fiber diameter directly affected the size and distribution of the fabric pore diameter. The larger the fiber diameter, the more uneven the distribution of fabric pore diameter, and the lower filtration efficiency. When the frequency of the web curtain was certain (6 Hz), the relationship between the frequency of the metering pump and the fiber diameter was shown in Table 12.

TABLE 12

Effects of the frequency of the metering pump on the fiber diameter and the air permeability

| Frequency of the metering pump (Hz) | Fiber diameter (μm) | Air permeability (mm/s) |
|---|---|---|
| 24 | 11.34 | 918 |
| 26 | 10.89 | 908 |
| 28 | 11.04 | 914 |

As shown in Table 12, with the increase of the frequency of the metering pump, the fiber diameter and the air permeability tended to decrease first and then increased. Based on the relationship between technological parameters and the air permeability of the spun-bonded non-woven fabric, the technological parameters could be changed to change the air permeability of the spun-bonded non-woven fabric to some extent.

In summary, the non-woven raw materials in this application, such as PLA, PHBV, nano-SiO$_2$, compatibilizers, chain extenders, etc., are full-degradable raw materials. So, the prepared non-woven fabric can be fully degradable, which can be used for preparing medical masks, surgical sheets and other medical consumables that will not cause environmental pollution after being used and discarded. At the same time, in this application, the PLA is modified in gradient several times, that is, the PLA is copolymerized and modified with ε-caprolactone, and the product is subjected to blending modification and chain extension modification to change the structure of the PLA, thus changing the properties of the polymer. The spun-bonded parameters (the spinning temperature, the temperature and pressure of the hot-pressing roller, the linear speed of the rolling mill, the frequency of the metering pump and the web curtain) are optimized to improve the performance of the non-woven fabric, such as mechanical properties, fiber diameter, air permeability, fiber strength, etc.

In the case of no conflict, the above embodiments and the features in the embodiments can be combined.

Described above are merely preferred embodiments of the application, and are not intended to limit the application. Any changes, equivalent replacements and modifications made without departing from the spirit and scope of the application should fall within the scope of the application defined by the appended claims.

What is claimed is:

1. A method for preparing a fully-degradable non-woven fabric by spun-bonding, comprising:
    (S1) adding lactic acid (L-LA) and ε-caprolactone (ε-CL) into a reactor to obtain a reaction system, wherein a weight ratio of the L-LA to the ε-CL is 1:(2-4);
    adding a catalyst to the reaction system followed by reaction at 130-140° C. under vacuum for 18-24 h to obtain a crude copolymerization product; wherein the catalyst is 0.1-0.2% of a total weight of the reaction system; and
    purifying the crude copolymerization product to obtain a caprolactone-lactic acid random copolymer P(CL-co-LA);
    (S2) drying polylactic acid (PLA), wherein a melt index of the PLA at 210° C. is 20-40 g/10 min;
    mixing a dried PLA and the (P(CL-co-LA)) uniformly followed by melt blending at 150-160° C. under a rotation speed of 100-120 r/min to obtain a blend, wherein a weight ratio of the dried PLA to the (P(CL-co-LA)) is (10-50):1, and the melt blending is performed for 5-10 min; and
    subjecting the blend to compression molding at 180-190° C. and 8-10 MPa to obtain a copolymerized modified PLA; and
    (S3) subjecting the copolymerized modified PLA, poly (3-hydroxybutyrate-co-3-hydroxyvalerate) (PHBV), nano-$SiO_2$, a compatibilizer and a chain extender to blending to obtain a melt-blown blend, wherein a weight ratio of the copolymerized modified PLA to the PHBV to the nano-$SiO_2$ to the compatibilizer to the chain extender is (70-85):(1-3):(0.2-0.3):(0.005-0.01):(0.001-0.005);
    feeding the melt-blown blend to a screw extruder followed by melt-extrusion and pelletization at 160-200° C. to obtain a blend pellet; and
    feeding the blend pellet to the screw extruder followed by melt extrusion to form a hot melt; accurately metering and transporting, by a metering pump, the hot melt to a spinneret assembly; ejecting the hot melt from a hole of a spinneret of the spinneret assembly followed by cooling, air-drawing, laying, and hot rolling-bonding to obtain a non-woven material; and subjecting the non-woven material to winding using a winding machine to obtain the fully-degradable non-woven fabric.

2. The method of claim 1, wherein in step (S1), the crude copolymerization product is purified through steps of:
    (S11) subjecting the crude copolymerization product to ultrasonic treatment and/or microwave treatment followed by precipitation with an ethanol solution with a volume fraction of 90%; and
    (S12) repeating step (S11) 1-2 times to obtain the P(CL-co-LA).

3. The method of claim 2, wherein the ultrasonic treatment is performed at an ultrasonic power of 250-350 W for 1.5-2.5 h; and the microwave treatment is performed at a microwave power of 250-350 W for 1.5-2.5 h.

4. The method of claim 1, wherein in step (S3), the compatibilizer is selected from the group consisting of maleic anhydride, butyric anhydride, stearic anhydride, tannic acid, and a combination thereof.

5. The method of claim 4, wherein the compatibilizer is a combination of maleic anhydride, butyric anhydride, stearic anhydride and tannic acid in a weight ratio of 1:2:2:1.

6. The method of claim 1, wherein in step (S3), the hot melt is ejected from the spinneret assembly at a temperature of 160-180° C.

7. The method of claim 1, wherein in step (S3), the cooling is performed in an airflow at a temperature of 20-24° C. and a flow rate of 0.8-1 m/s.

8. The method of claim 1, wherein in step (S3), a speed of the air-drawing is controlled to 4500-5000 m/min.

9. The method of claim 1, wherein in step (S3), the hot rolling-bonding is performed at a temperature of 135-145° C., a pressure of 6-10 MPa, and a rolling speed of 31-33 rpm.

10. The method of claim 1, wherein in step (S3), a frequency of the metering pump is 24-28 Hz, and a frequency of a web curtain is 6-8 Hz.

* * * * *